United States Patent [19]
Shiraishi et al.

[11] Patent Number: 5,978,925
[45] Date of Patent: Nov. 2, 1999

[54] SYSTEM FOR IMPROVING PROCESSING EFFICIENCY IN A PIPELINE BY DELAYING A CLOCK SIGNAL TO A PROGRAM COUNTER AND AN INSTRUCTION MEMORY BEHIND A SYSTEM CLOCK

[75] Inventors: Mikio Shiraishi, Yokohama; Masaki Saitou, Sagamihara; Yuji Okuda, Tokyo, all of Japan

[73] Assignee: Kabushiki Kaisha Toshiba, Kawasaki, Japan

[21] Appl. No.: 08/979,850

[22] Filed: Nov. 26, 1997

[30] Foreign Application Priority Data

Nov. 29, 1996 [JP] Japan ................................ 8-319657

[51] Int. Cl.⁶ .................................................. G06F 13/00
[52] U.S. Cl. ...................... 713/400; 713/401; 713/500; 712/220
[58] Field of Search .................................. 395/562, 561, 395/565, 555, 558, 551; 713/401, 400, 500, 503; 712/224, 221, 220

[56] References Cited

U.S. PATENT DOCUMENTS

| | | | |
|---|---|---|---|
| 5,086,500 | 2/1992 | Greub | 395/552 |
| 5,185,869 | 2/1993 | Suzuki | 395/581 |
| 5,815,017 | 9/1998 | McFarland | 327/158 |

FOREIGN PATENT DOCUMENTS 64-58039  3/1989  Japan .

*Primary Examiner*—Meng-Al T. An
*Assistant Examiner*—Mackly Monestime
*Attorney, Agent, or Firm*—Banner & Witcoff, Ltd.

[57] ABSTRACT

In a pipelined processor, when a conditional branch is effected in accordance with a state of calculation generated by immediately previous instruction, it is necessary for a conventional technique to insert a NOP (no operation) instruction before a conditional branch instruction. This lowers the processing efficiency. In order to solve this problem, a delay circuit generates a clock signal $\phi'$ which is supplied to a program counter and an instruction memory. The clock signal $\phi'$ is delayed behind a system clock $\phi$. This obviates the need to insert such a NOP instruction and the processing efficiency is improved.

13 Claims, 4 Drawing Sheets

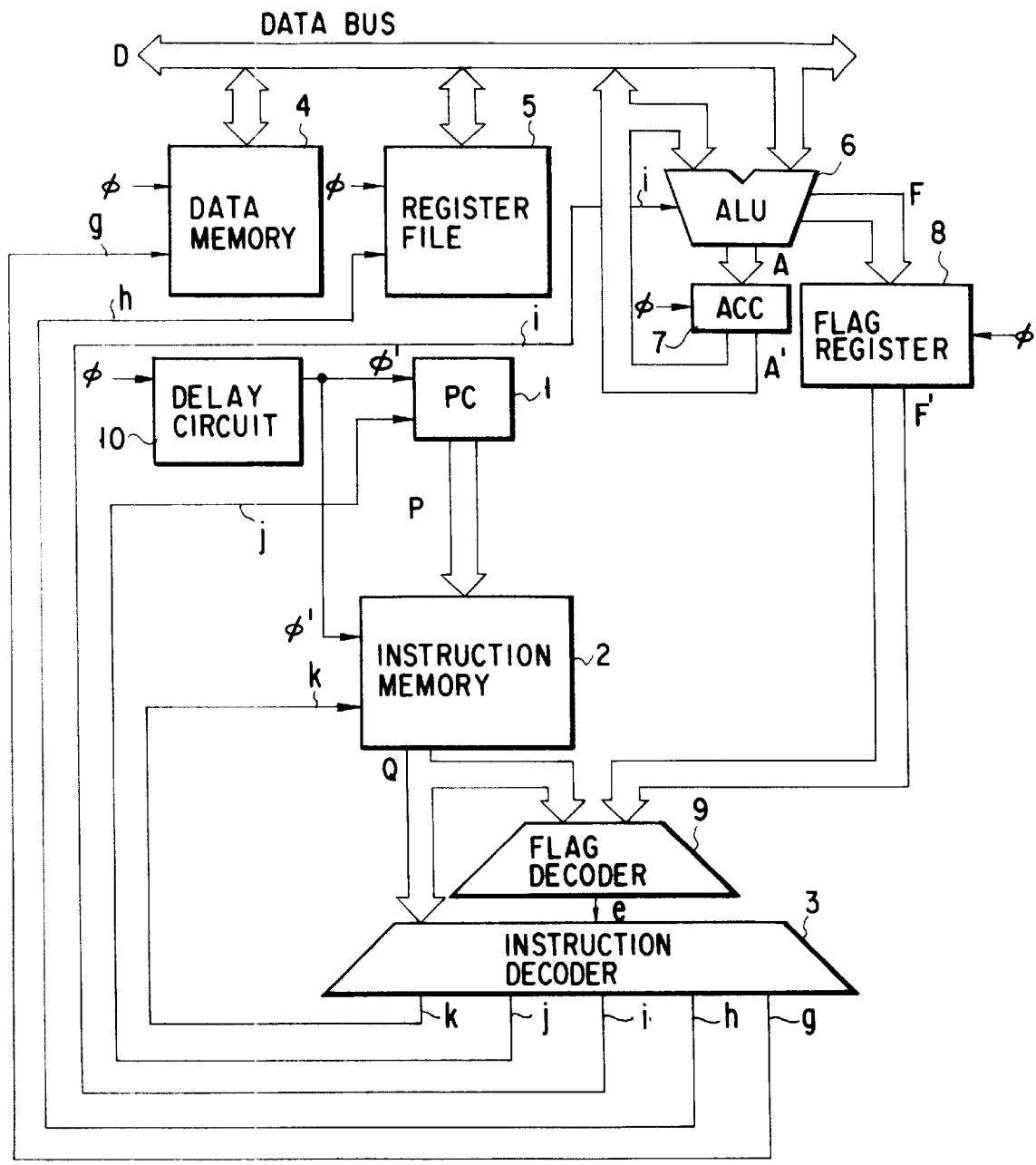
F I G. 1

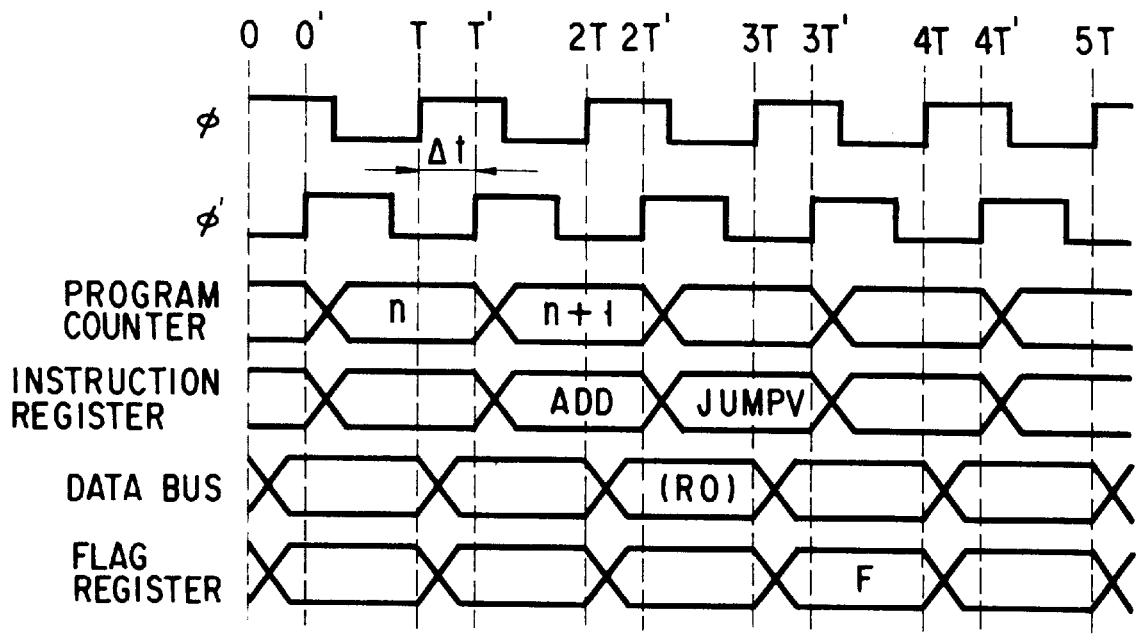
F I G. 2
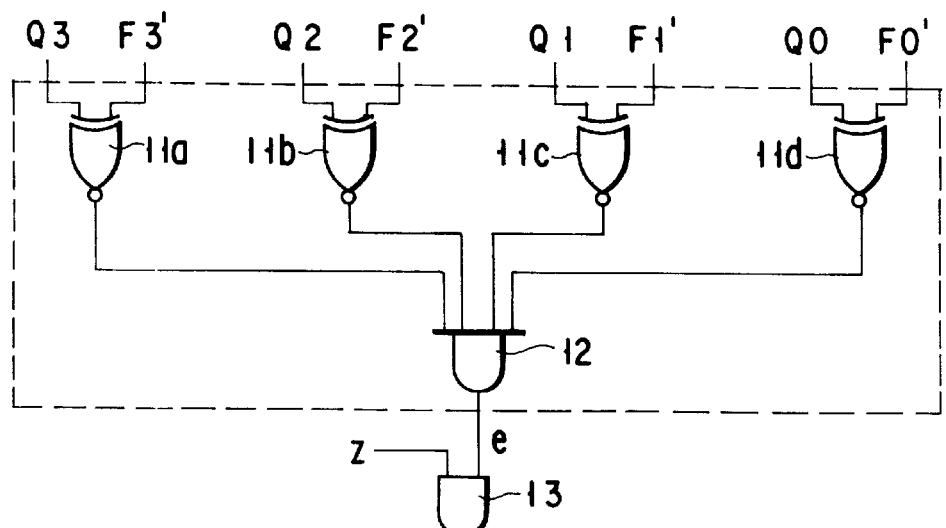
F I G. 3

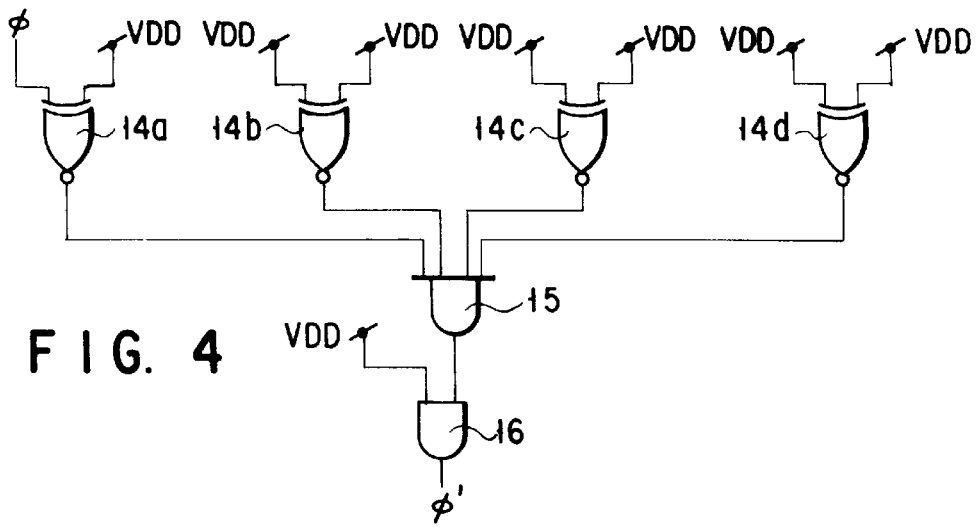
F I G. 4
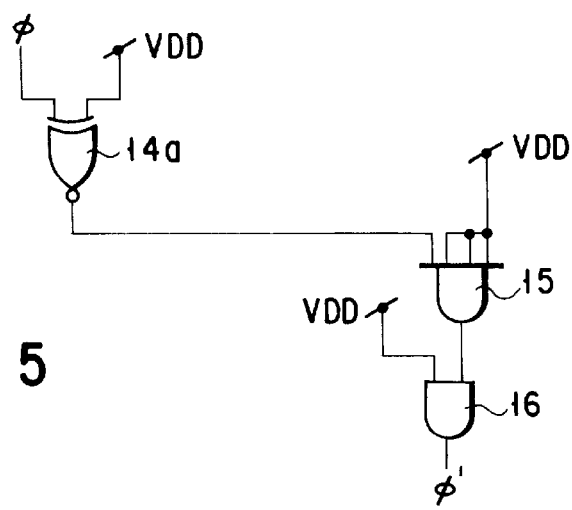
F I G. 5

SYSTEM FOR IMPROVING PROCESSING EFFICIENCY IN A PIPELINE BY DELAYING A CLOCK SIGNAL TO A PROGRAM COUNTER AND AN INSTRUCTION MEMORY BEHIND A SYSTEM CLOCK

BACKGROUND OF THE INVENTION

The present invention relates to a signal handling processor and, in particular, a processor for enabling the decoding and execution of instructions through a pipeline system.

FIG. 6 is a block diagram of a conventional microprocessor. Like reference numerals are employed to designate like parts or elements throughout the specification and any further explanation is omitted for similar parts or elements above.

The microprocessor shown in FIG. 6 comprises a program counter (PC) 1, an instruction memory 2, an instruction decoder 3, a data memory 4, a register file 5, a calculation circuit 6, [such as an arithmetic logic unit (ALU)], an accumulator 7, and a flag register 8.

The program counter 1 outputs an address signal P, which is applied to an address signal input terminal of the instruction memory 2. The instruction memory 2 allows the reading of an instruction Q stored in an address corresponding to the address signal P and writing of the instruction Q to an instruction register IR (not shown).

The instruction Q stored in the instruction register IR is applied to an instruction input terminal of the instruction decoder 3. The instruction decoder 3 decodes the content of the instruction and applies control signals g, h, i, j and k corresponding to the instruction Q to control terminals of the data memory 4, the register file 5, the calculation circuit 6, the program counter 1 and the instruction memory 2, respectively.

The data input and output terminals of the data memory 4, the register file 5 and the calculation circuit 6 are connected to a data bus. Data D is transferred between the data memory 4, the register file 5 and the calculation circuit 6 via the data bus. A system clock signal $\phi$ is applied to the clock input terminals of the program counter 1, the instruction memory 2, the data memory 4, the register file 5, the accumulator 7 and the flag register 8. The program counter 1, the instruction memory 2, the data memory 4, the register file 5, the accumulator 7 and the flag register 8 are operated in synchronism with a rise of a system clock signal $\phi$.

The calculation circuit 6 performs a calculation on data A' stored in the accumulator 7 and the data D supplied via the data bus. The result of the calculation is data A, which is stored in the accumulator 7. Any specific state, occurring upon the calculation, such as overflowing, sign of a result, zero as a result, and a carry output, is represented as a state signal of one bit called a "flag". The calculation circuit 6 collects such flags, and produces a flag signal F.

The flag register 8 stores the flag signal F. An output signal F' of the flag register 8 is applied as a calculated flag signal to a flag input terminal of the instruction decoder 3. The instruction decoder 3 utilizes the calculated flag signal F' as a branching condition of a conditional branch instruction. The conditional branch instruction is used when an instruction execution procedure is controlled.

The above-mentioned state signal is allocated to the calculated flag signal F' in the following way:

A third bit F3': an overflow flag V is "1" at an overflowing time and otherwise "0".

A second bit F2',: a signal flag S is "1" for a negative result and otherwise "0".

A first bit F1': a zero flag Z1 for a result of all 0s and otherwise "0".

A zero-th bit F0': a carry flag C is "1" at a carry from the most significant digit and otherwise "0".

For the instruction set of the processor, the following conditional branch instructions are prepared for controlling an instruction execution procedure in accordance with the respective flags.

JUMPV LABEL1; at F3'="1", branch to an address LABEL1

JUMPS LABEL1; at F2'="1", branch to an address LABEL1.

JUMPZ LABEL1; at F1'="1", branch to an address LABEL1.

JUMPC LABEL1; at F0'="1", branch to an address LABEL1.

In order to enhance the processing efficiency of the processor, a conventional technique is used for performing the instruction decode processing and instruction execute processing through a pipeline system. According to this technique, except for a first instruction reading step, a subsequent instruction reading and instruction executing step can be simultaneously effected. For this reason, a processor can achieve processing throughput about two times higher than a processor not using any pipeline system.

In such a processor using the pipeline system, the period in which an instruction described immediately before the conditional branch instruction is superimposed on the period in which the conditional branch instruction is decoded. It is, therefore, impossible, based on the instruction described immediately before the conditional branch instruction, to effect branching with the use of a content-varied flag.

The following is an example of a program with a combined calculation instruction and conditional branch instruction.

ADD A, R0; add the content of the register R0 to the accumulator's content A.

NOP; not operated.

JUMPV LABEL1; at an overflow flag F3'="1" branch to LABEL1.

For this exemplary program, at a first line the content of the register R0 at a zero-th of the register file 5 is applied to the input terminal of the calculation circuit (ALU) 6 via the data bus. The calculation circuit 6 adds the content in the register R0 and the content in the accumulator ACC 7 together and again stores the result of the addition into the accumulator 7.

At a second line, nothing is executed. This is a NOP (no operation) instruction, which is used for timing matching. Such an NOP instruction is included in an instruction set of most processors.

At a third line, detection is made to determine whether any overflowing occurs, and, if YES, a branch is made to LABEL1 address.

FIG. 7 shows a timing chart for executing the above-mentioned program with a calculation instruction and conditional branch instruction combined in a conventional processor using a pipeline system. This timing chart shows a time variation of an address signal P output from the program counter 1, an instruction Q held in the instruction requester IR, data D at the data bus, and a flag calculation signal F' held at the flag register 8. T represents a machine cycle.

As shown in FIG. 7, at a time T, an ADD instruction is read from an n address in the instruction memory 2 and written to the instruction register IR.

Then an ADD instruction is decoded and, at a time 2T, the content (R0) of the register R0 is read onto the data bus. Further, an NOP instruction is read from an n+1 address in the instruction memory 2 and written to the instruction register IR.

Subsequently, the content A' held in the accumulator 7 and data (R0) on the data bus are added together in the calculation circuit 6. At a time 3T, the result of the addition is written to the accumulator 7 and a flag F is written to the flag register 8. The flag register 8 outputs the flag signal F as a calculated flag signal F'. And at the time 3T a JUMPV instruction is read out from n+2 address in the instruction memory 2 and written to the instruction register IR.

Then the JUMPV instruction is decoded. At a time 4T, the instruction decoder 3 decides, with the use of an overflow flag F3' output from the flag register, whether or not any overflowing occurs. If YES, using the control signal j, the instruction decoder 3 causes an address signal, which is output from the program counter 1, to vary.

As evident from the above, the time 3T at which an overflow flag F3' is varied by the addition instruction is 2 machine cycles after the time T at which the ADD instruction is read out as the instruction Q. Therefore, if the conditional branch instruction is described immediately after the addition instruction, the output flag signal F' of the flag register 8 varies after the conditional branch instruction has been decoded by the instruction decoder 3. As a result, it becomes impossible to use, as a branching condition, the variation of a flag resulting from the addition instruction. In order to prevent this, the NOP instruction is inserted so that a result of the ADD instruction can be used as a condition of the JUMPV instruction.

In the conventional processor, in order to use the result of the addition instruction as the condition of the branch instruction, it is necessary to insert the NOP instruction as described above, thereby lowering the processing efficiency. In the case where, the conditional branch is executed in the repeating loop, its adverse effect appears prominent. As a result, the actual execution speed of the program becomes slower and an unexpected error actually occurs.

BRIEF SUMMARY OF THE INVENTION

It is accordingly an object of the present invention to provide a processor which can execute the branching of a program in accordance with the state of calculation done by an instruction immediately previous to a conditional branch instruction in a pipeline processor and improve processing efficiency.

Accordingly, the processor of the present invention comprises a delay circuit, which receives at its input terminal a system clock signal, and outputs a delay clock signal as a delayed replica of the system clock signal. A program counter receives at a clock terminal the delay clock signal, receives at a control terminal a control signal, and outputs an address signal in synchronism with the delay clock signal. An instruction storage device receives at a clock terminal the delay clock signal and at an address terminal the address signal. The instruction storage device stores a calculation procedure and data transfer procedure as an instruction and outputs the instruction. A calculator performs a calculation operation and outputs a state signal in accordance with a result of the calculation operation. A state storage device receives at a clock terminal the system clock signal, and stores a state signal which is output from the calculator. A state decoder receives the state signal stored in the state storage device and an instruction output from the instruction storage device and outputs a state decision result in accordance with the these two signals. An instruction decoder receives the state decision result and an instruction from the instruction storage device and outputs the control signal. A conditional branch operation is performed in accordance with the state signal which is based on an execution of an instruction described immediately previous to a conditional branch instruction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a processor according to an embodiment of the present invention;

FIG. 2 is a timing chart of a conditional instruction executed by the processor shown in FIG. 1;

FIG. 3 is a schematic of a flag decoder of the processor of FIG. 1 according to the present invention;

FIG. 4 shows a schematic of a first embodiment of a clock delay circuit of the processor of FIG. 1 according to the present invention;

FIG. 5 shows a schematic of a second embodiment of the clock delay circuit of the processor of FIG. 1 according to the present invention;

DETAILED DESCRIPTION OF THE INVENTION

Figure 7:
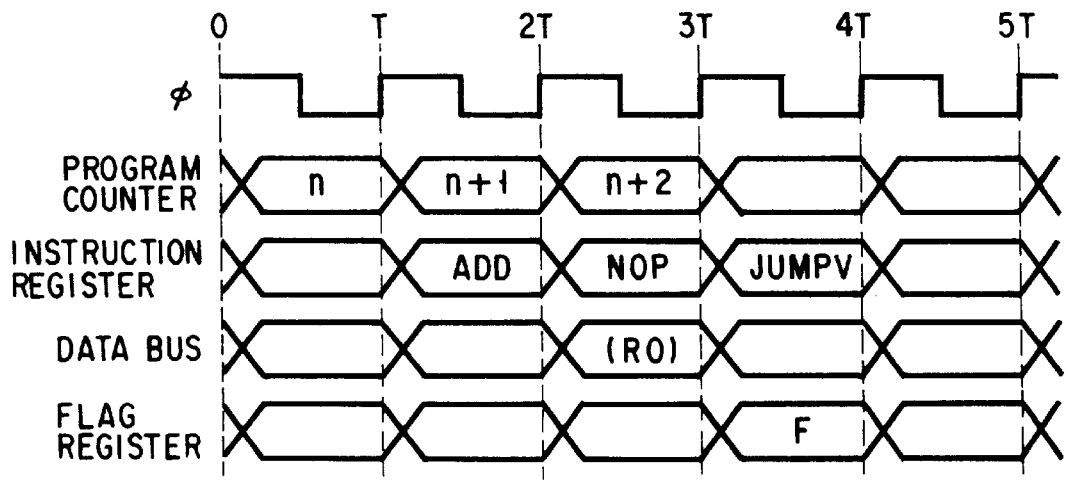
FIG. 7 is a timing chart of the conventional microprocessor of FIG. 6.
Figure 6:
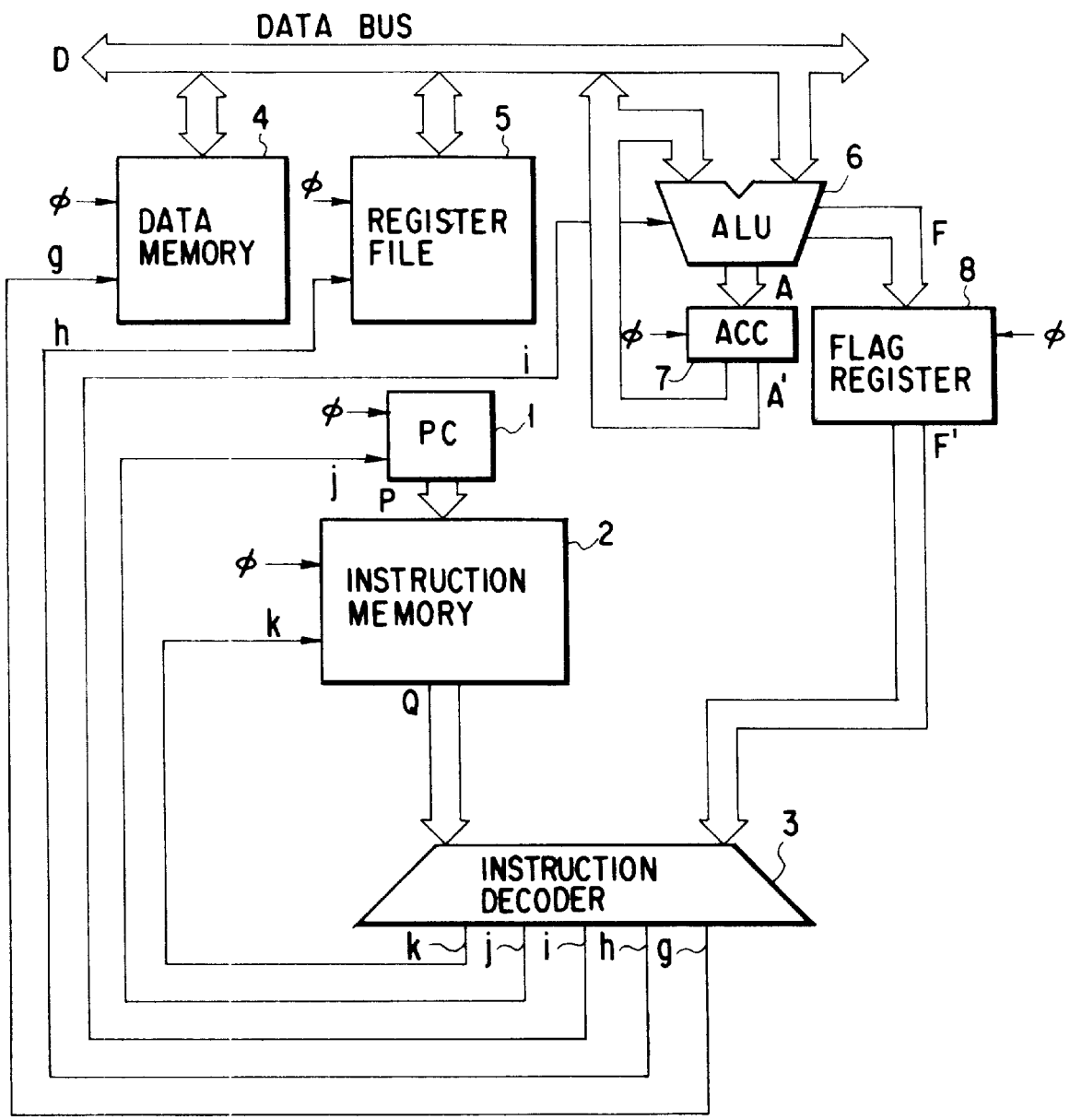
FIG. 6 is a block diagram of a conventional microprocessor.

An embodiment of the present invention will be explained below with reference to the accompanying drawings.

FIG. 1 shows a block diagram of a processor according to the present invention. The processor comprises a program counter (PC) 1, an instruction memory 2, an instruction decoder 3, a data memory 4, a register file 5, a calculation circuit 6 [e.g. an arithmetic logic unit (ALU)], an accumulator 7, a flag register 8, a flag decoder 9 and a clock delay circuit 10.

The program counter 1 outputs an address signal P.

The address signal P output from the program counter 1 is applied to an address signal input terminal of the instruction memory 2. The instruction memory 2 reads out an instruction Q from an address corresponding to the address signal P and writes it to an instruction register IR (not shown).

The instruction Q stored in the instruction register IR is applied to an instruction input terminal of the instruction decoder 3. The instruction decoder 3 decodes the content of the instruction Q and applies control signals g, h, i, j and k corresponding to the instruction Q to control terminals of the data memory 4, the register file 5, the calculation circuit 6, the program counter 1 and the instruction memory 2, respectively.

The data input/output terminals of the data memory 4, the register file 5 and the calculation circuit 6 are connected to the data bus. Data D is transferred between the data memory 4, the register file 5 and the calculation circuit 6 via the data bus.

The calculation circuit 6 receives data A' stored in the accumulator 7 and data D applied via the data bus and executes a calculation on the data A' and D. The result of the calculation is data A, which is stored again in the accumulator 7.

Any specific state produced upon the calculation, such as overflowing, sign of a result, zero as the result and carry output, is represented as a state signal of one bit called a "flag". The calculation circuit 6 collects such flags, and produces a flag signal F.

The flag register 8 stores the flag signal F, which is output from the calculation circuit 6. The flag register 8 has its stored signal output as a calculated flag signal F'.

The calculated flag signal F' output from the flag register 8 is applied to a flag input terminal of the flag decoder 9. And the instruction Q output from the instruction memory 2 is applied to an instruction input terminal of the flag decoder 9. The flag decoder 9 generates a control signal e in accordance with the instruction Q and calculated flag signal F' and applies it to a control terminal of the instruction decoder 3.

The instruction decoder 3 varies the control signals j and k in accordance with the input control signal e and executes a branch instruction or conditional branch instruction. A time taken for the flag decoder 9 to decode the flag and for the instruction decoder 3 to output the control signals j and k is hereinafter referred to as a flag decode time $\tau$.

A system clock signal $\phi$ is applied to an input terminal of the clock delay circuit 10 and the clock delay circuit 10 delays the system clock signal $\phi$ by an amount $\Delta t$ for instance and outputs a delay signal $\phi'$. The amount $\Delta t$ is set to be greater than the flag decode time $\tau$.

The delay clock signal $\phi'$ is applied to the program counter 1 and the instruction memory 2. The system clock signal $\phi$ is applied to the input terminals of the data memory 4, the register file 5, the accumulator 7 and the flag register 8. The program counter 1, the instruction memory 2, the data memory 4, the register file 5, the accumulator 7 and the flag register 8 are operated in synchronism with a rise of the system clock signal $\phi$ applied to the clock input terminal.

In the embodiment shown in FIG. 1, the clock signal $\phi'$ obtained by delaying the clock signal $\phi$ at the clock delay circuit 10 is applied to the program counter 1 and the instruction memory 2. On the other hand, the underlying clock signal $\phi$ is applied to the flag register 8. Therefore, by terminating the decoding at the flag decoder 9 during a time period from the rise of the system clock signal $\phi$ to the rise of the delayed clock signal $\phi'$, a branch operation can be executed based on a flag variation which is based on an immediately previous calculation.

FIG. 2 shows a timing chart when a conditional instruction is executed by the processor shown in FIG. 1. The timing chart shows a time variation of the system clock $\phi$, its delayed clock signal $\phi'$, an address signal P output from the program counter register 1, an instruction Q held in the instruction register IR and data D on the data bus. The time T is one machine cycle.

The following shows an example of a program corresponding to the timing chart shown in FIG. 2.

ADD A, R0; add the content of the register R0 to the content A of the accumulator.

JUMPV LABEL1: At an overflow flag 3'="1", branch to a LABEL1.

For the exemplary program, at a first line, the content of 0th register R0 in the register file 5 is applied via the data bus to the calculation circuit 6 and added to the content of the accumulator 7. A result of the addition is stored in the accumulator 7. At a second line, detection is made to determine whether any overflowing occurs, and, if YES, branching is made to the LABEL1 address.

As shown in FIG. 2, at a time T' an ADD instruction is read from an n address in the instruction memory 2 and written to the instruction register IR. Then the instruction decoder 3 decodes an ADD instruction and outputs the control signal h and other appropriate control signals.

Then at a time 2T', the JUMPV instruction is read from an n+1 address of the instruction memory 2 and written to the instruction register IR. Then the instruction decoder 3 decodes a JUMPV instruction.

In the calculation circuit 6, the content A' held in the accumulator 7 is added to the data (R0) on the data bus, and, at a time 3T, a result of addition is written to the accumulator 7. And at the time 3T, a flag signal F is written to the flag register 8. The flag register 8 applies the flag signal F as a calculated flag signal F' to the flag input terminal of the flag decoder 9. The flag decoder 9 decodes the JUMPV instruction and calculation flag signal F' by a time 3T' and outputs a control signal e representing whether or not a corresponding condition is established.

Thereafter, at the time 3T', the instruction decoder 3 executes a conditional branch instruction in accordance with the instruction decoder 3.

Since, in the present embodiment, the delay circuit 10 is used for generating the delayed clock signal $\phi'$, the operation timing of the program counter 1 is controlled in accordance with the delayed clock signal $\phi'$, so that the address signal output from the program counter 1 is delayed. Further, the delayed clock signal $\phi'$ is input to the instruction memory 2, so that the instruction memory 2 outputs its instruction Q delayed by the delay time of the delayed clock $\phi'$. The flag decoder 9 generates a control signal e in accordance with the instruction Q and the calculation flag signal F', and the instruction decoder 3 executes a branch instruction or conditional branch instruction. On the other hand, the flag register 8 receives the undelayed, system clock signal $\phi$. Thus, by terminating the decoding at the flag decoder 9 during a time period from the rise of the system clock signal $\phi$ to the rise of the delayed clock signal $\phi'$, a branch operation can be executed based on the flag variation which is based on the immediately previous calculation. That is, by terminating the decoding at the flag decoder 9 during such a time period as described above, the output flag signal F' of the flag register 8 varies before the conditional branch instruction is decoded by the instruction decoder 3. As a result, it becomes possible to use, as a branching condition, the variation of a flag resulting from the immediately previous calculation. Accordingly, in the present invention, it is possible to, without providing any no operation (NOP) instruction, sequentially execute the branch condition generating calculation instruction and conditional branch instruction. Thus, high-speed processing is achieved and the coding of the program becomes easier because it is unnecessary to insert the NOP instruction.

FIG. 3 shows a circuit of one embodiment of the flag decoder 9 according to the present invention.

Lower four bits Q3, . . . , Q0 of an instruction Q for instance are applied to the first input terminals of respective exclusive NOR gates 11a to 11d. Three bits F3', . . . F0' of the calculated flag signal F' are applied to second input terminals of the respective exclusive NOR gates 11a to 11d. The output terminals of the exclusive NOR gates 11a, . . . , 11d are connected to the respective first, . . . , fourth input terminals of an AND gate 12. The AND gate 12 generates the control signal e. An AND gate 13 outside the broken line in FIG. 3 constitutes part of the instruction decoder 3. The control signal e is applied to a first input terminal of the AND gate 13 and a signal Z generated from a different section (not shown) of the instruction decoder 3 is applied to the second input terminal. The AND gate 13 generates a control signal j of the program counter 1.

When the flag decoder as shown in FIG. 3 is used, the lower four bits Q3, . . . , Q0 of the conditional branch instruction JUMPV are set as "1", "0", "0", "0", respectively. When the JUMPV instruction is decoded, F3'="1" and, if F2' to F0' are "0", the control signal e becomes "1" and the corresponding branch is executed. Further, F3'="0", the control signal e becomes "0" and no branch is executed.

FIG. 4 shows a schematic of a first embodiment of the clock delay circuit 10 according to the present invention.

The clock delay circuit 10 comprises exclusive NOR gates 14a, . . . , 14d and AND gates 15, 16. The system clock signal φ is applied to the first input terminal of the exclusive NOR gate 14a. A power supply potential VDD is connected to the second input terminal of the exclusive NOR gate 14a and to the first and second input terminals of the exclusive NOR gates 14b, . . . , 14d. The exclusive NOR gates 14a, . . . , 14d and AND gates 15, 16 are connected in a manner similar to that of the exclusive NOR gates 11a, . . . , 11d and AND gates 12, 13 shown in FIG. 3. The second input terminal of the AND gate 16 is connected to the power supply potential VDD and the AND gate 16 outputs the delay clock signal φ'.

When a time difference Δt between the rise of the system clock signal φ and that of the delay clock signal φ' is greater than an operation time τ of the instruction decoder 3 including the flag decoder 9, an excessive operation time is increased by Δt−τ. As a result, the machine cycle T becomes longer by Δt−τ than an originally required length and the operation speed is lowered by that extent. As shown in FIG. 4, however, by setting the delay time of the clock delay circuit 10 approximately equal to the delay time of the flag decoder 9 and instruction decoder 3, Δt is made approximate to τ, so that the operation speed can be improved.

FIG. 5 shows a second embodiment of the clock delay circuit 10 according to the present invention. The clock delay circuit 10 shown in FIG. 5 is a maximal delay path (critical path) of the clock delay circuit 10 shown in FIG. 4.

As shown in FIG. 5. the system clock signal φ is applied to a first input terminal of an exclusive NOR gate 14a and a power supply potential VDD is applied to a second input terminal of the exclusive NOR gate 14a. The output terminal of the exclusive NOR gate 14a is connected to the first input terminal of an AND gate 15 and the output terminal of the AND gate 15 is connected to a first input terminal of an AND gate 16. The second, . . . , fourth input terminals of the AND gate 15 and a second input terminal of the AND gate 16 are connected to a power supply potential VDD. The AND gate 16 outputs the delay clock signal φ'.

By thus deleting the critical path-constituting gates of the circuit of FIG. 4 and properly connecting the input terminals of these gates to the power supply potential VDD or ground potential, it is possible to obtain the same effect as that of the embodiment shown in FIG. 4 and to reduce the size of the delay circuit.

As set out above, according to the present invention, it is possible to describe a branch instruction-deciding instruction immediately previous to the conditional branch instruction and to improve the processing efficiency of the processor because it obviates the necessity of inserting the NOP instruction for timing matching.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A processor comprising:

a delay circuit for providing a delay clock signal in response to a system clock signal;

a program counter for providing an address signal in response to the delay clock signal;

an instruction storing circuit for storing an instruction and for outputting the instruction in response to the delay clock signal and the address signal;

a calculation circuit for performing a calculation operation and for outputting a state signal in accordance with a result of the calculation operation;

a state decoding circuit for providing a state decision in response to the state signal and the instruction; and an instruction decoding circuit for generating a control signal in response to the state decision result and the instruction, wherein the control signal is indicative of a conditional branch operation for execution in response to the state signal which is based on an execution of a prior instruction immediately previous to the instruction when the instruction is a conditional branch instruction.

2. The processor according to claim 1, wherein the delay circuit has the same circuit arrangement as the state decoding circuit.

3. The processor according to claim 1, wherein the delay circuit has the same circuit arrangement as included in a critical path of the state decoding circuit.

4. The processor according to claim 1, wherein the delay circuit has a delay time greater than a delay time of the state decoding circuit.

5. A processor comprising:

a delay circuit, supplied at its input terminal with a system clock signal, for outputting a delay clock signal as a delayed replica of the system clock signal;

a program counter, supplied at a clock terminal with the delay clock signal and at a control terminal with a control signal, for outputting an address signal in synchronism with the delay clock signal;

an instruction storing circuit, supplied at a clock terminal with the delay clock signal and at an address terminal with the address signal, for storing an instruction and for outputting the instruction;

a calculation circuit for performing a calculation operation and for outputting a state signal in accordance with a result of the calculation operation;

a state storing circuit, supplied at a clock terminal with the system clock signal, for storing a state signal which is output from the calculation circuit;

a state decoding circuit for receiving the state signal stored in the state storing circuit and an instruction output from the instruction storing circuit and for outputting a state decision result in accordance with the state signal and the instruction; and an instruction decoding circuit for receiving the state decision result and an instruction from the instruction storing circuit and for outputting the control signal, wherein a conditional branch operation is performed in accordance with the state signal which is based on an execution of an instruction described immediately previous to a conditional branch instruction.

6. The processor according to claim 5, wherein the delay circuit has the same circuit arrangement as the state decoding circuit.

7. The processor according to claim 5, wherein the delay circuit has the same circuit arrangement as included in a critical path of the state decoding circuit.

8. The processor according to claim 5, wherein the delay circuit comprises a circuit having a delay time greater than a delay time in the critical path of the state decoding circuit.

9. A processor comprising:

calculation means for performing a calculation operation and for outputting a state signal in accordance with a result of the calculation operation;

state storing means, supplied at a clock terminal with a system clock signal, for storing and outputting the state signal which is output from the calculation means, in synchronism with the system clock signal;

delay means, supplied at its input terminal with the system clock signal, for outputting a delayed clock signal which is delayed by a predetermined period of time from the system clock signal;

a program counter supplied at a control terminal with a control signal and at a clock terminal with the delayed clock signal, the program counter being operated in synchronism with the delayed clock signal, for outputting an address signal in accordance with the control signal at a time delayed by a predetermined period time from a time when the calculation means outputs the state signal;

instruction storing means, supplied at an address input with an address signal from the program counter and at a clock terminal with the delayed clock signal, the instruction storing means being operated in synchronism with the delayed clock signal, for storing and outputting an instruction at a time delayed by the predetermined period of time from the time when the calculation means outputs the state signal;

state decoding means for receiving the state signal stored in the state storing means and the instruction output from the instruction storing means and for outputting a state decision result in accordance with the state signal and the instruction; and instruction decoding means for receiving the state decision result and an instruction from the instruction storing means and for outputting the control signal supplied to the program counter, wherein a conditional branch operation is performed in accordance with the state signal which is based on an execution of an instruction described immediately previous to a condition branch instruction upon the state decision output by the state decoding means, by operating the program counter at the time delayed by the predetermined period of time from the time of the operation of the state storing means, whereby a no operation cycle does not exist between the instruction described immediately previous to the condition branch instruction and the condition branch instruction.

10. The processor according to claim 9, wherein the delay means has the same circuit arrangement as the state decoding means.

11. The processor according to claim 9, wherein the delay means has the same circuit arrangement as included in a critical path of the state decoding means.

12. The processor according to claim 9, wherein the delay means comprises a circuit having a delay time greater than a delay time in the critical path of the state decoding means.

13. A processor comprising:

a delay circuit having an output for providing a delay clock signal in response to a system clock signal applied to an input thereof;

a program counter having an input coupled to the output of the delay circuit and having an output for providing an address signal in response to the delay clock signal;

an instruction storage device for storing an instruction, having a first input coupled to the output of the delay circuit, having a second input coupled to the output of the program counter and having an output for providing the instruction in response to the delay clock signal and the address signal;

a calculator for performing a calculation operation and for outputting a state signal in accordance with a result of the calculation operation;

a state decoder having a first input coupled to the output of the calculator, having a second input coupled to the output of the instruction storage device and having an output for providing a state decision in response to the state signal and the instruction; and an instruction decoder having a first input coupled to the output of the state decoder, having a second input coupled to the output of the instruction storage device and having an output for generating a control signal in response to the state decision and the instruction, wherein the control signal is indicative of a conditional branch operation for execution in response to the state signal which is based on an execution of a prior instruction immediately previous to the instruction when the instruction is a conditional branch instruction.

* * * * *